United States Patent [19]

Chervenak

[11] Patent Number: 4,497,507
[45] Date of Patent: Feb. 5, 1985

[54] VEHICLE AXLE SUSPENSION

[75] Inventor: Paul R. Chervenak, Warren, Mich.

[73] Assignee: Granning Suspensions, Inc., Livonia, Mich.

[21] Appl. No.: 483,598

[22] Filed: Apr. 11, 1983

[51] Int. Cl.³ .......................................... B60G 11/26
[52] U.S. Cl. .................................. 280/704; 267/20 R
[58] Field of Search ............ 280/704, 712; 267/20 R, 267/20 A, 60

[56] References Cited

U.S. PATENT DOCUMENTS

| | | | |
|---|---|---|---|
| 2,621,942 | 12/1952 | Getz | 280/43.18 |
| 2,895,742 | 7/1959 | Johnson | 267/20 R |
| 3,199,890 | 8/1965 | Caldwell | 280/43.23 |
| 3,278,197 | 10/1966 | Gerin | 267/20 A |
| 3,285,621 | 11/1966 | Turner, Jr. | 280/43.23 |
| 3,286,657 | 11/1966 | Browne | 280/81 R |
| 3,390,895 | 7/1968 | Verdi | 280/704 |
| 3,617,072 | 11/1971 | Turner, Jr. | 280/704 |
| 3,689,102 | 9/1972 | Granning | 280/112 R |
| 3,704,896 | 12/1972 | Buelow | 280/81 A |
| 3,730,549 | 5/1973 | Turner, Jr. | 280/704 |
| 3,771,812 | 11/1973 | Pierce et al. | 280/704 |
| 3,794,344 | 2/1974 | Raidel | 280/704 |
| 3,831,210 | 8/1974 | Ow | 280/414.5 |
| 3,870,336 | 3/1975 | Bilas | 280/704 |
| 3,877,718 | 4/1975 | Scanlon et al. | 280/704 |
| 3,904,220 | 9/1975 | Fier | 280/704 |
| 3,935,606 | 2/1976 | Soot | 280/704 |
| 4,000,913 | 1/1977 | Gibson | 280/704 |
| 4,065,153 | 12/1977 | Pringle | 280/704 |
| 4,082,305 | 4/1978 | Allison et al. | 280/704 |
| 4,102,424 | 7/1978 | Heinze | 280/704 |
| 4,157,188 | 6/1979 | Sims | 280/704 |
| 4,165,884 | 8/1979 | Allison et al | 280/704 |
| 4,166,639 | 9/1979 | Taylor | 280/704 |
| 4,293,145 | 11/1981 | Taylor | 280/704 |
| 4,300,787 | 11/1981 | Vandenberg | 280/704 |

FOREIGN PATENT DOCUMENTS 961516  1/1975  Canada ............................... 280/704

Primary Examiner—Richard A. Bertsch
Assistant Examiner—Ross Weaver
Attorney, Agent, or Firm—Barnes, Kisselle, Raisch, Choate, Whittemore & Hulbert

[57] ABSTRACT

An auxiliary vehicle axle suspension which is pivoted to the frame for up and down movement. An air bellows unit is provided to force the axle down to a load-supporting position. Apparatus is provided to lift the axle to an elevated position when pressure is relieved in the air bellows unit, the apparatus being spring-operated.

2 Claims, 5 Drawing Figures

VEHICLE AXLE SUSPENSION

This invention relates generally to vehicle axle suspensions and refers more particularly to an auxiliary vehicle axle suspension having a pivoted lift mechanism.

BACKGROUND AND SUMMARY OF THE INVENTION

It is often desirable to provide an auxiliary axle suspension for a road vehicle such as a truck-tractor or trailer to increase the load-carrying capacity of the vehicle. The present invention provides a novel spring lifting mechanism to enable the axle to be lifted when there is reduced load on the vehicle, thus saving both tire wear and engine fuel and enhancing vehicle maneuverability.

In the conventional pivoted auxiliary axle suspension, the load is transmitted to the vehicle frame by means such as one or more air bellows units. The axle lifting mechanism comprises one or more mechanical springs. When air is relieved from the air bellows, the mechanical springs pull the axle up to an elevated position out of ground engagement, the stress in the springs diminishing. When the air bellows are again pressurized, the wheels are forced downwardly into ground engagement with the stress in the mechanical springs increasing. This increase in mechanical spring stress is undesirable because it preloads the suspension and thus reduces the permissible load that the suspension can carry.

In the specific embodiment about to be described, the lifting mechanism comprises a cylinder having a reciprocable member therein that is operatively connected to the axle. A spring urges the reciprocable member in a direction to lift the axle. The cylinder is pivoted to the vehicle frame to enable the line of the lifting force to follow generally the movement of the axle as it is raised and lowered. This construction eliminates the linkage involved in some prior art constructions such, for example, as that shown in U.S. Pat. No. 3,771,812.

Further in accordance with the present invention, the pivot for the spring lifting mechanism is so located with respect to the pivot for the auxiliary axle suspension that the lever arm of the spring force line increases as the axle rises. Hence, the axle may be held elevated with less spring force. Moreover, as the axle descends and increases the spring stress, the lever arm of the spring force line decreases so that the lifting torque applied to the axle when its wheels are in ground engagement is reduced, similarly reducing the sacrifice in pay load.

Other objects of the invention will become apparent as the following description proceeds, especially when considered with the accompanying drawings.

DETAILED DESCRIPTION

Figure 1:
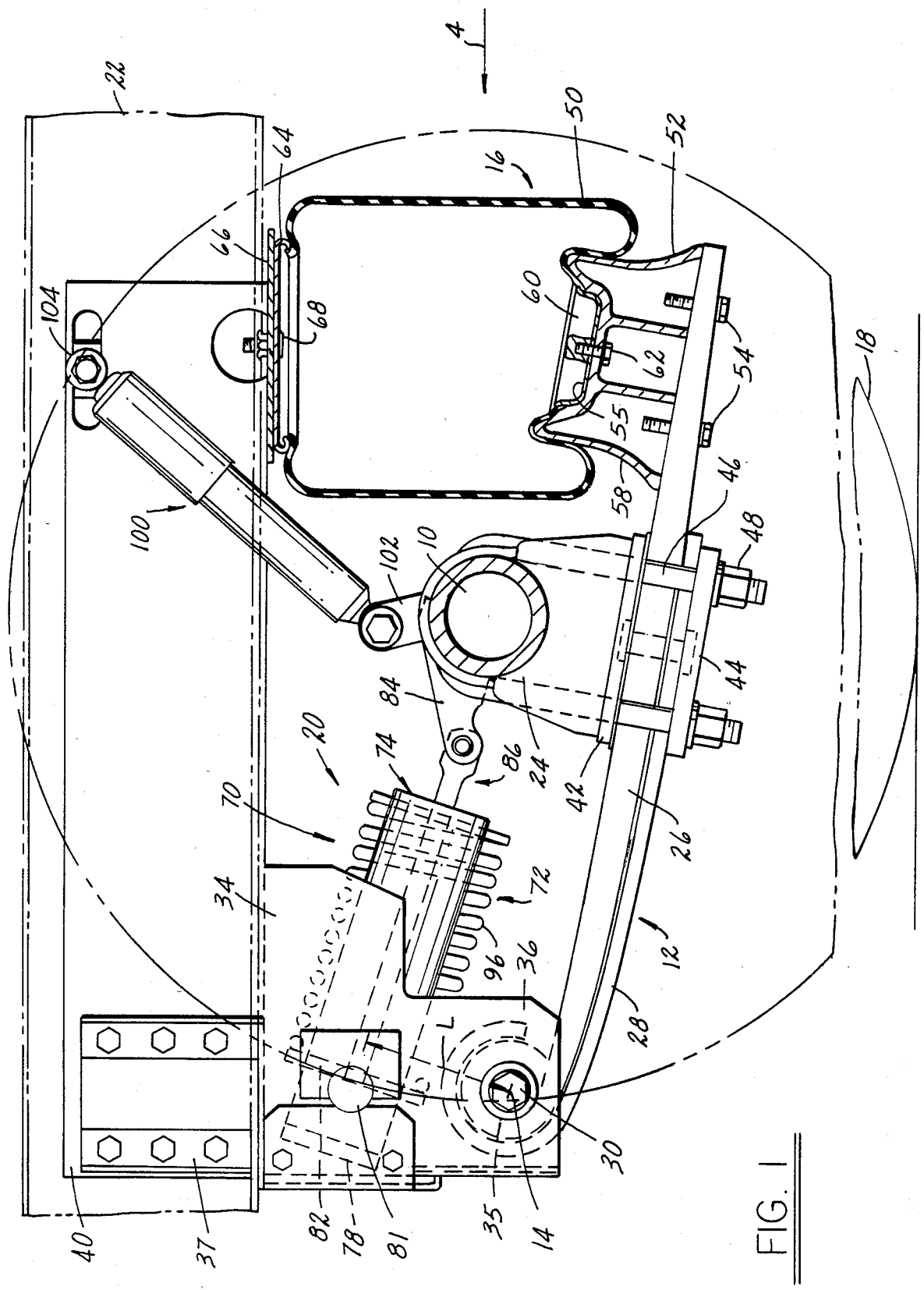
FIG. 1 is a side elevational view of an auxiliary vehicle axle suspension constructed in accordance with the present invention, showing the axle in the down or load-supporting position.

Referring now more particularly to the drawings, an auxiliary axle suspension is shown including an axle 10, a beam assembly 12 which supports the axle for pivotal movement about the pivot axis 14, an air bellows unit 16 for forcing the axle to the down or load-supporting position in which the wheel 18 on the axle contacts the ground, and a lift mechanism 20 for elevating the axle above the load-supporting position far enough to remove the wheel from contact with the ground. The pivot axis 14 is spaced from the axle 10 in a direction toward the front of the vehicle. The axle suspension is carried by a longitudinal frame member 22 of the vehicle. It will be understood that the frame member 22 extends along one side of the vehicle and that a similar frame member parallel to member 22 will extend along the opposite side of the vehicle and carry an axle suspension similar to the one here shown and described.

Figure 3:
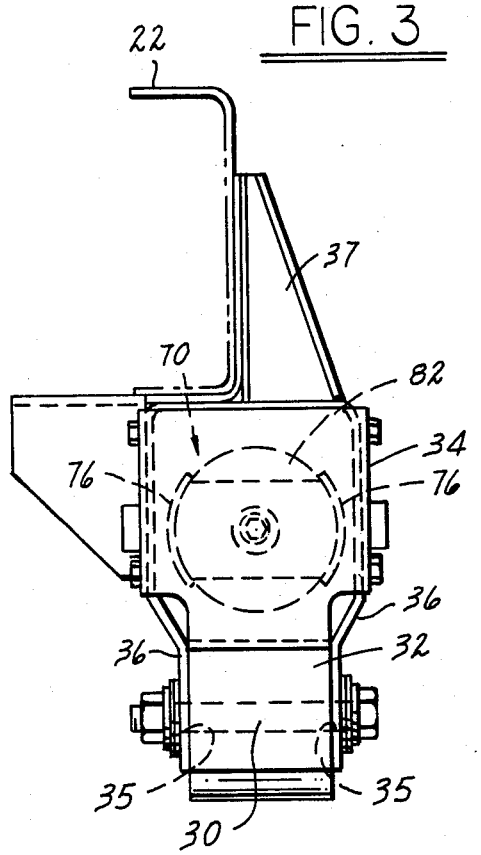
FIG. 3 is a view looking in the direction of the arrow 3 in FIG. 1.
Figure 4:
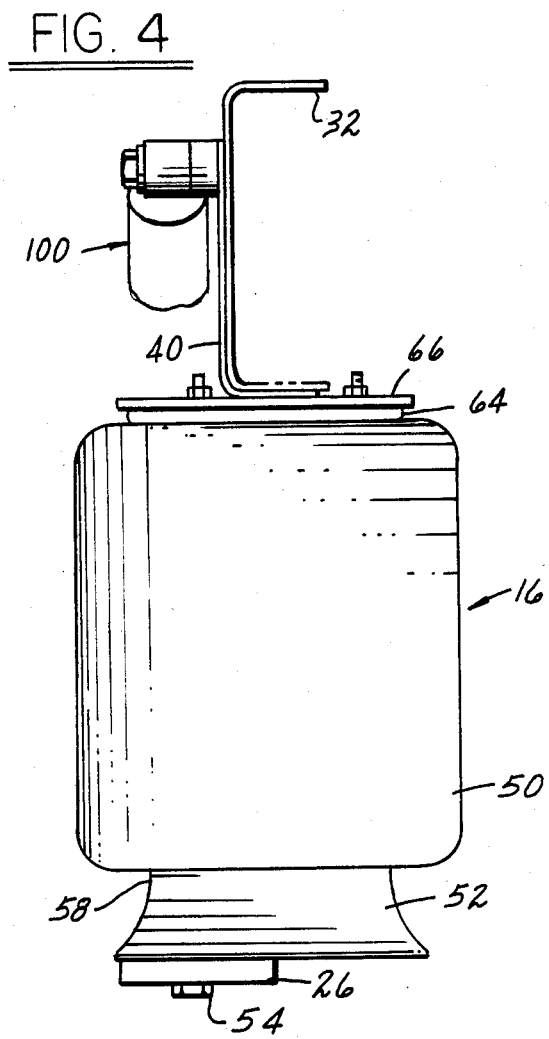
FIG. 4 is a view looking in the direction of the arrow 4 in FIG. 1.
Figure 5:
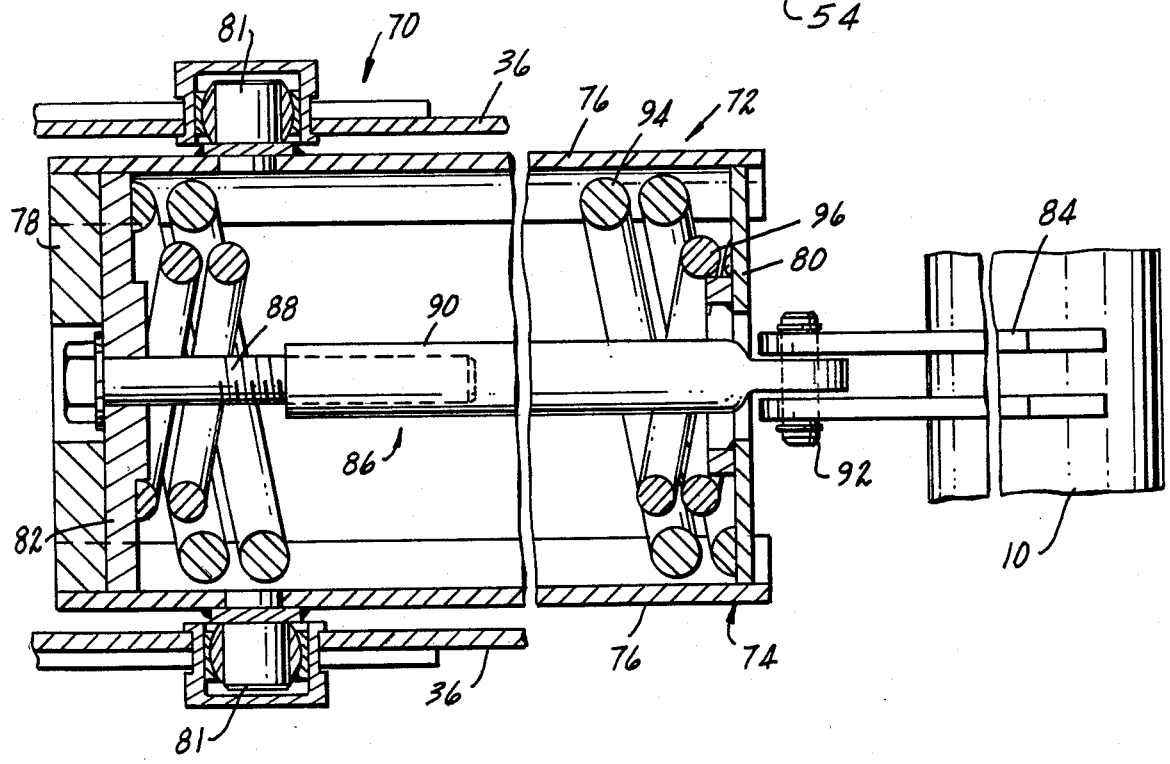
FIG. 5 is a sectional view taken on the line 5—5 in FIG. 2.

The axle 10 is horizontal and extends at right angles to the longitudinal centerline of the vehicle. It is attached to a seat or saddle 24 which is clamped to the beam assembly 12. The beam assembly 12 consists of a main spring 26 and an auxiliary spring 28 the corresponding ends of which circle around the horizontal bolt 30 which forms the pivot axis 14 about which the axle is capable of moving. A suitable bushing 32 is provided between the end of the beam and the bolt. The bolt 30 is mounted on a hanger 34 which is of inverted U-shape as shown in FIG. 3 with the bolt extending through holes 35 in the side members 36 of the hanger and across the space therebetween. Holes 35 are preferably horizontally elongated to permit longitudinal adjustment in the position of bolt 30. This hanger 34 is secured to a bracket 37 bolted to a side angle member 40 which in turn is secured to the frame member 22.

The saddle 24 has a bottom plate 42. The beam assembly is clamped between the bottom plate of the saddle and a clip plate 44 by a U-bolt 46 and nuts 48 threaded on the ends of the U-bolt. As seen in FIG. 1 the U-bolt extends over the top of the axle so that tightening of the nuts 48 rigidly secures the saddle 24, and hence the axle 10, to the beam assembly. As a result, the beam assembly 12 provides a resilient mount for the axle and permits up and down movement of the axle in an arc about the pivot axis 14.

The axle 10 is forced downward to a load-supporting position pressing its wheel into ground contact by the air bellows unit 16 which includes the flexible tubular air bellows 50 and the piston 52. Piston 52 is secured by fasteners 54 to one end of the main spring 26. The piston has a concave upper surface 55 merging in a curve with its annular side wall 58. A cup 60 secured by fastener 62 to the concave upper surface of the piston secures and seals the lower end of the air bellows to the concave upper surface of the piston. A circular plate 64 with a rolled edge clamps and seals the upper end of the tubular air bellows. The circular plate 64 is secured to the mounting plate 66 by fasteners 68 and the mounting plate in turn is secured rigidly to the bottom flange of the side angle 40. When air under pressure is introduced to the air bellows, it forces the axle downward to the load-supporting position shown in FIG. 1 in which wheel 18 engages the ground.

The lift mechanism 20 for raising the axle comprises a power device 70 having a resilient unit 72 above bolt 30 and between the side members 36 of the hanger. The resilient unit comprises a cylinder 74 composed of two arcuate, longitudinally extending side wall members 76. The ends of the cylinder 74 are closed by end plates 78 and 80. The cylinder 74 is open at the top and bottom between the longitudinal edges of the two wall members 76. The cylinder 74 is pivoted to the side members 36 by pins 81 defining a horizontal pivot axis spaced above and parallel to the pivot axis of bolt 30.

A piston 82 is reciprocable within the cylinder and is connected to a bracket 84 on the axle 10 by a connecting rod assembly 86 including the rod parts 88 and 90 which are threadedly connected for adjustment purposes. The rod part 90 extends through an opening in cylinder end plate 80 and is pivoted to the bracket 84 by pin 92.

Figure 2:
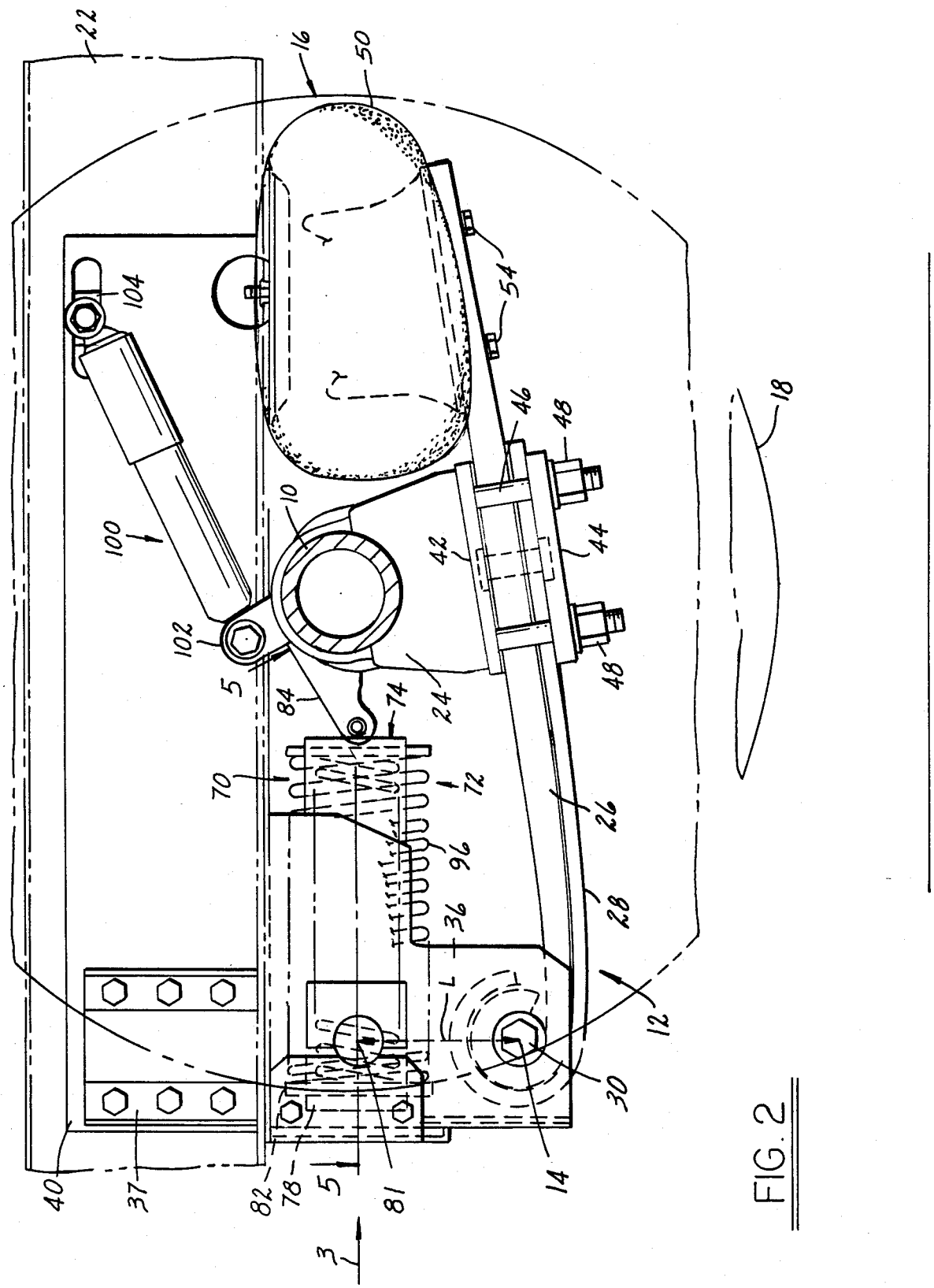
FIG. 2 is similar to FIG. 1 but shows the axle in the raised position.

A pair of coil springs 94 and 96 within the cylinder 74 are compressed between the end plate 80 and the piston 82 to urge the piston to the left in FIGS. 1 and 2, thus tending to raise the axle assembly. While the lift spring pack is shown as consisting of coil springs 94 and 96, which have proved to be successful and in some applications may be preferred, it will be understood that the spring lift pack could be made of something other than coil springs, such for example, as a Bellville Spring or an elastomeric spring.

FIG. 1 shows the axle assembly in the lower position in which wheel 18 engages the ground, at which time the spring unit is compressed placing increased stress upon the springs and tilting the cylinder to a downwardly inclined position. FIG. 2 shows the axle assembly in the raised position in which the spring unit is under reduced stress an assumes a more or less horizontal position. It will be noted that the line of the lifting force, which runs along the longitudinal axis of the springs 94 and 96 (also coincides with the centerline of the rod assembly 86) follows generally the movement of the axle as it is raised and lowered.

The axis of pivot 81 is so located with respect to the axis of pivot 30 of the auxiliary axle suspension that the length of the lever arm of the spring force line increases as the axle rises. Therefore, the axle may be held elevated with less spring force. The lever arm, incidentally, is perpendicular to the spring force line and passes through the axis of pivot 30, and is designated L in the drawings. As the axle 10 descends, increasing the spring stress, the lever arm L decreases in length so that the lifting torque applied to the axle 10 when its wheels are in ground engagement is reduced.

A shock absorber 100 is shown having one end pivoted to the bracket 102 on the axle 10 and the other end pivoted to a mount 104 secured to the side angle member 40.

In operation, when air under a pressure of, for example, 25 p.s.i. to 100 p.s.i. is introduced to the air bellows 50, the beam assembly 12 which carries axle 10 is forced downward to the load-supporting position of FIG. 1 placing the wheel 18 in ground engagement. The force of the air bellows unit is sufficient to move the piston 82 to the position shown in FIG. 1 against the action of springs 94 and 96. However, when the air pressure in air bellows 50 is relieved by suitable means now shown, the force of the springs 94 and 96 is sufficient to push the piston 82 all the way to the left (see FIG. 2) against the end plate 78 and, through the rod assembly 86, to elevate the axle to the FIG. 2 position and thereby lift wheel 18 clear of the ground.

As before stated, there will be a similar axle suspension on the opposite side of the vehicle from the one shown in the drawings. The two axles, that is the axle 10 and the aligned axle of the other suspension on the opposite side of the vehicle, may be joined by a rigid connector or may be one continuous beam.

When the axle suspension of this invention is disposed ahead of or leads the drive wheels it is sometimes called a pusher suspension. When it is disposed behind or trails the drive wheels it is sometimes called a tag suspension. When used on a trailer the designations "pusher" and "tag" are not used.

I claim:

1. The combination with a vehicle frame having a frame, of a hanger depending from said frame, an auxiliary axle, means mounting said axle for up and down pivotal movement comprising a generally horizontal beam assembly whicn extends longitudinally of the vehicle and is pivoted at one end to said hanger for movement about a first horizontal axis, said axle being secured to said beam assembly between its ends in spaced relation to said first horizontal axis, selectively operable mechanism depending from said frame and acting on the opposite end of said beam assembly for forcing said beam assembly and axle downward to a load-supporting position, and means effective when said mechanism is not operating for lifting said beam assembly and axle to an elevated position above said load-supporting position, said lifting means comprising a power device having an elongated extensible and contractable resilient unit one end of which is connected to said axle, the opposite end of the said resilient unit being pivoted to said hanger for movement of said resilient unit about a second horizontal axis spaced from the first horizontal axis, said resilient unit applying a force on a line in the direction of its length to urge said beam assembly and axle to said elevated position, and said resilient unit and second horizontal axis being so located that the lever arm of the line of force with respect to said first horizontal axis decreases in length as the beam assembly and axle are forced downward to load-supporting position.

2. The combination defined in claim 1, wherein said resilient unit extends generally parallel to said beam assembly and comprises a cylinder member, a reciprocable member in said cylinder member, one of said members being pivoted to said hanger for movement about said second horizontal axis and the other of said members being pivoted to said axle, and spring means in said cylinder member acting upon said reciprocable member in a direction to elevate said beam assembly and axle.

* * * * *